United States Patent

Mori et al.

[11] Patent Number: 6,108,435
[45] Date of Patent: Aug. 22, 2000

[54] METHOD OF DETECTING PHASE DIFFERENCE BETWEEN A PAIR OF IMAGES

[75] Inventors: Kenichi Mori; Shotaro Yokoyama, both of Nagano, Japan

[73] Assignee: Fuji Electric Co., Ltd., Japan

[21] Appl. No.: 08/570,939

[22] Filed: Dec. 12, 1995

[30] Foreign Application Priority Data

Dec. 15, 1994 [JP] Japan .................................. 6-311437

[51] Int. Cl.[7] .................................................. G06K 9/46
[52] U.S. Cl. .................... 382/106; 382/191; 382/255; 382/278; 250/201.8; 396/128; 356/4.04
[58] Field of Search .................................. 382/255, 278, 382/154, 218, 216, 106, 191; 250/201.8; 396/128; 356/3.14, 4.04

[56] References Cited

U.S. PATENT DOCUMENTS

| | | | |
|---|---|---|---|
| 4,633,073 | 12/1986 | Horikawa | 250/201.8 |
| 4,904,855 | 2/1990 | Nishibe et al. | 250/201.8 |
| 4,956,660 | 9/1990 | Takahashi | 396/104 |
| 5,134,526 | 7/1992 | Inabata | 250/201.8 |
| 5,602,944 | 2/1997 | Yokoyama et al. | 382/278 |
| 5,608,664 | 3/1997 | Mori | 364/822 |
| 5,619,301 | 4/1997 | Suzuki et al. | 396/128 |

FOREIGN PATENT DOCUMENTS 1-13510  1/1989  Japan .

*Primary Examiner*—Jon Chang
*Attorney, Agent, or Firm*—Rossi & Associates

[57] ABSTRACT

A method of detecting a phase difference between a pair of images of an object which are formed on a pair of optical sensor arrays through different optical paths, with presence of flare in one of the images, is disclosed. The method includes the steps of: preparing a sensor data group representing a pattern of each image and consisting of sensor data received from each optical sensor array; correcting the sensor data group so as to eliminate a difference in the average value of the sensor data between the optical sensor arrays; preparing a plurality of combinations each having two subgroups corresponding to the pair of optical sensor arrays, each subgroup consisting of a predetermined number of a series of sensor data, which are selected from the sensor data group corrected, such that a portion of the sensor data group from which the subgroup is selected is sequentially shifted; and selecting one of the combinations having a maximum degree of correlation between the subgroups, and detecting a phase difference from positions on the optical sensor arrays which correspond to the subgroups of the selected combination.

6 Claims, 3 Drawing Sheets

METHOD OF DETECTING PHASE DIFFERENCE BETWEEN A PAIR OF IMAGES

FIELD OF THE INVENTION

The present invention relates to a method, in which a pair of left and right optical sensor arrays receive a pair of images of an object through mutually different optical paths, to detect a difference in relative positions of the images on the optical sensor arrays, which is usually called a phase difference between the pair of the images, so as to detect a distance to an object in an auto-focusing camera, for example, or to detect a degree of deviation from its focused state in which the camera is focused on the object.

BACKGROUND OF THE INVENTION

To focus an auto-focusing camera or the like on an object by a so-called passive method, a distance to an object needs to be detected by external light triangulation distance measuring method in the case of a lens-shutter camera, or, in the case of a TTL camera, a degree of deviation from its focused condition needs to be detected by use of internal light passing through an image pick-up lens, as known in the art. In either case, a pair of images of the object are usually formed on a pair of optical sensor arrays, through mutually different optical paths, by means of an optical system including lenses, to electrically detect a difference in the relative positions of the pair of images. While this difference is defined on a position coordinate, with respect to reference positions of the optical sensor arrays which correspond to the optical axes of the optical system, this difference between the images may be defined on a time coordinate, with respect to reference phases corresponding to the reference positions, and therefore may be usually called a phase difference.

This phase difference has been detected by a conventional method including the steps of: 1) preparing a sensor data group representative of a pattern of light-intensity distribution of the image, which consists of sensor data received from a plurality of optical sensors in each optical sensor array; 2) preparing a plurality of subgroups each consisting of a fixed number of a series of sensor data, from each of the left and right sensor data groups, such that a portion of the sensor data group from which the subgroup is picked up is sequentially shifted; and 3) preparing a plurality of combinations of two subgroups corresponding to the left and right optical sensor arrays.

In the next step, a degree of correlation between the subgroups is observed with respect to each combination, to find a combination having the maximum correlation. Although each subgroup represents only a part of the image pattern of the object, the maximum correlation between the two subgroups selected from the left and right sensor data groups means that the parts of the left and right image patterns represented by the subgroups substantially coincide with each other. This makes it possible to know how much the left and right images should be shifted from the portions of the sensor data groups from which the two subgroups of the combination having the maximum correlation are selected, so as to coincide the image patterns with each other. Namely, a difference between the relative positions of the pair of images can be detected.

In actual application, the plurality of combinations of the subgroups are numbered in a predetermined order, and the phase difference as a difference between the pair of images is easily calculated by adding or subtracting constants determined by the positional relationship between the optical sensor arrays and the optical system for forming images, for example, to or from the number of the combination that is determined to have the maximum correlation. While the phase difference thus detected is an integer as it is, with the array pitch of the optical sensors in each optical sensor array used as a unit, an estimated value may be calculated with respect to each combination, as an index representing the degree of correlation between the subgroups in the combination, and the phase difference is usually detected with the accuracy of about two decimal places, by interpolation using the estimated values of the combinations before and after the one having the maximum correlation.

In the conventional phase difference detecting method as described above, the phase difference is detected by preparing the left and right sensor data groups representative of the patterns of the pair of images formed on the left and right optical sensor arrays, sequentially shifting the portions of these sensor data groups from which the subgroups are picked up, and determining the combination having the maximum correlation between the left and right subgroups. This method is principally based on the assumption that the maximum correlation is detected when the image patterns represented by the left and right subgroups coincide with each other. If the left and right images of the object differ in brightness or pattern for some reason, the above assumption is not accurately realized, with a result of a reduction in the accuracy with which the phase difference is detected.

The above problem may occur when a kind of stray light called flare intrudes into or enters one of the left and right optical sensor arrays, as they catch an image of an object in backlight caused by the sun or bright illumination such as neon signs. This flare corresponds to fog in photography. The above one optical sensor array receives a much brighter image due to the extraordinary intense light than the other optical sensor array, and provides a pattern of light intensity distribution of this image which is considerably different from that provided by the other sensor array.

FIG. 6 shows the result of observation of errors $\blacktriangle\sigma$ in detected values of phase differences $\sigma$, when the left and right images of an object differed in brightness or pattern, due to intrusion of stray light. The object used in this test had a simple pattern in which the brightness was different between the left half and the right half thereof, and the contrast between the left and right halves was varied in five steps or degrees. The axis of abscissas in the graph of FIG. 6 indicates a so-called EV (Exposure Value) representing this contrast, and, as well known in the art, a difference of 1EV means that the brightness of one half is twice as much as that of the other half. Although the error $\blacktriangle\sigma$ in the phase difference $\sigma$ was reduced with an increase in the EV, the error $\blacktriangle\sigma$ still exceeded 0.5, which is an ordinary permissible upper limit, even when the EV is 4, that is, the contrast between the left and right halves of the object was as much as 64 (i.e. the brightness of one of the left and right halves of the object is 64 times as much as that of the other half).

In the light of the above problems, it is an object of the present invention to provide a method of detecting a phase difference with improved accuracy, even if left and right images received by a pair of optical sensor arrays differ in brightness or pattern thereof, due to intrusion of stray light.

SUMMARY OF THE INVENTION

The above object may be attained according to a first aspect of the present invention, which provides a method of detecting a phase difference between a pair of images of an object, which images are formed on a pair of optical sensor arrays through different optical paths, comprising the steps of: preparing a sensor data group representing a pattern of each of the pair of images and consisting of sensor data received from each of the pair of optical sensor arrays; correcting the sensor data group so as to eliminate a difference in an average value of the sensor data between the optical sensor arrays; preparing a plurality of combinations each having two subgroups corresponding to the pair of optical sensor arrays, each of the two subgroups consisting of a predetermined number of a series of sensor data selected from the sensor data group compensated, such that a portion in the sensor data group from which the subgroup is selected is sequentially shifted; and selecting one of the combinations having a maximum degree of correlation between the subgroups thereof, and detecting a phase difference from positions on the optical sensor arrays which correspond to the subgroups of the selected combination.

The same object may be attained according to a second aspect of the present invention, which provides a method including the steps of: preparing a plurality of combinations each having two subgroups corresponding to the pair of optical sensor array and selected from the sensor data groups which have not compensated, in the same manner as described above; correcting the subgroups of each combination so as to eliminate a difference in a representative value of the sensor data between the subgroups; and selecting one of the combinations having a maximum degree of correlation between the subgroups thereof which have been compensated, and detecting a phase difference from positions on the optical sensor arrays, which correspond to the subgroups of the selected combination. Preferably, the representative value of each subgroup is a value of one of the sensor data having a predetermined data number, or an average value of the sensor data of each subgroup.

The above object may also be attained according to a third aspect of the invention, which provides a method including the steps of: correcting a pair of sensor data groups by replacing each of the sensor data with a differential approximate value associated with a variable in the form of a data number of each sensor data, and preparing a plurality of combinations each having two subgroups corresponding to the pair of optical sensor arrays, each subgroup being selected from the corresponding one of the sensor data groups compensated; and selecting one of the combinations having a maximum degree of correlation between the subgroups thereof, and detecting a phase difference from positions on the optical sensor arrays, which correspond to the subgroups of the selected combination.

In the above third method of the invention, a two-point approximate value or a three-point approximate value may be preferably used as the differential approximate value for correcting the sensor data groups. In the case of the two-point approximate value, the differential approximate value may be obtained as a difference between a first sensor data and a second sensor data which is adjacent to the first sensor data in a predetermined direction.

In the first method of the present invention, a difference in the brightness between left and right images due to intrusion of stray light is compensated by correcting the left and right sensor data groups so as to eliminate a difference in the average of data values between the optical sensor arrays. In the second method of the invention, a difference in the brightness of the images and a change in the image pattern are compensated by correcting the left and right subgroups of each combination, so as to eliminate a difference between the representative values of the sensor data of these two subgroups. In the third method of the invention, each sensor data of the left and right sensor data groups is replaced by its differential approximate value, whereby a difference in the brightness between the left and right images due to stray light is compensated, and a change in the image pattern is also compensated as long as a characteristic of increase and decrease of a variable in the form of a data number is not changed. In any of these three methods, the adverse influence of the stray light on the brightness or pattern of the image can be effectively minimized or eliminated, and the error in the phase difference can be reduced several tenths to one tenth as compared with the conventional method. It is also possible to somewhat enhance the accuracy of the phase difference when no stray light enters the optical sensor array.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figure 1A:
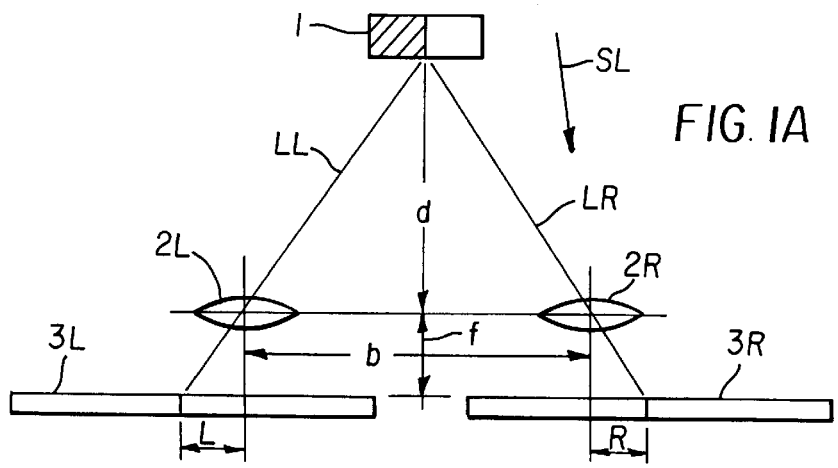
FIG. 1(a) is a view of an optical system showing the manner how left and right optical sensor arrays receive a pair of images of an object.
Figure 1B:
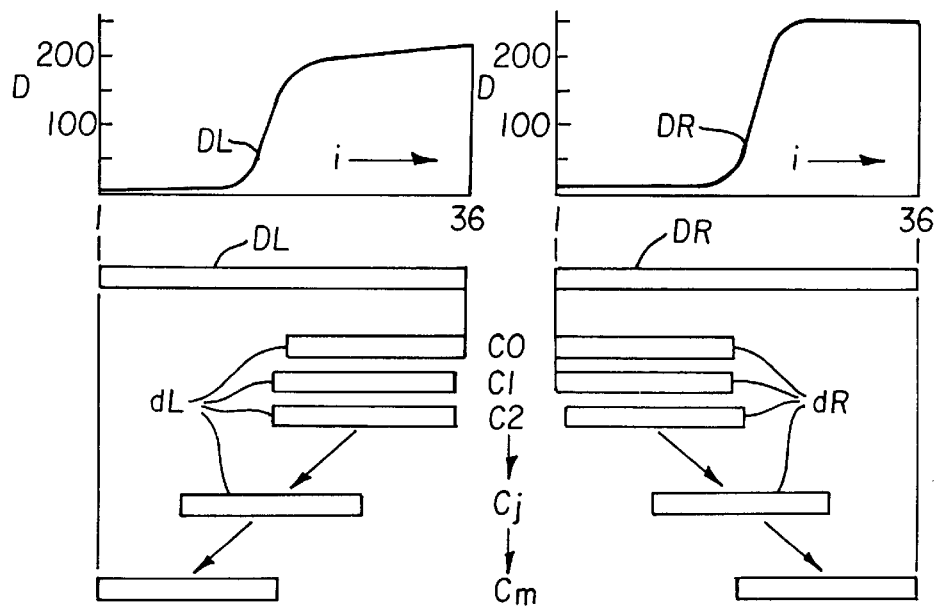
FIG. 1(b) is a view schematically showing the manner of preparing combinations of subgroups from left and right sensor data groups representing the pair of images.
Figure 1C:
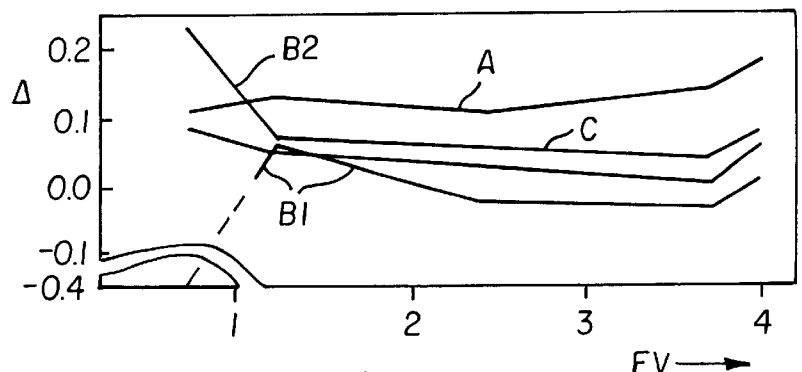
FIG. 1(c) is a graph showing errors in the phase difference detected by the first through third methods of the invention.
Figure 2:
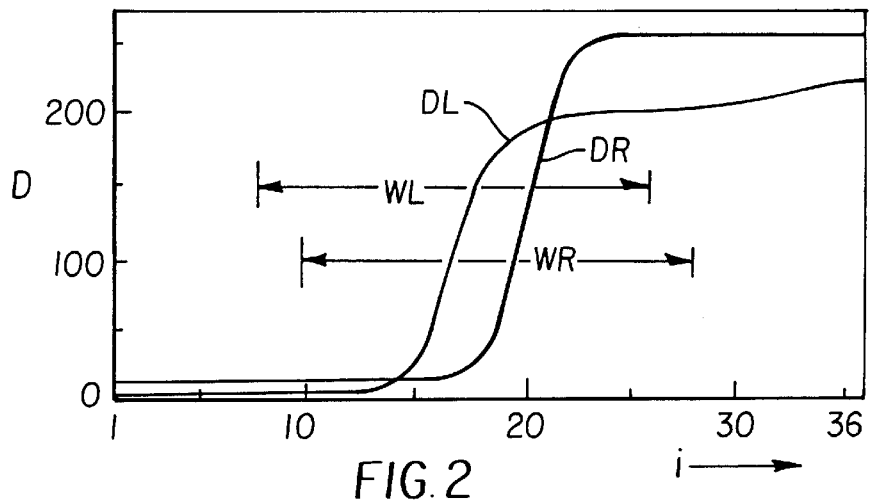
FIG. 2 is a pattern diagram showing both the left and right sensor data groups before they are corrected.
Figure 3:
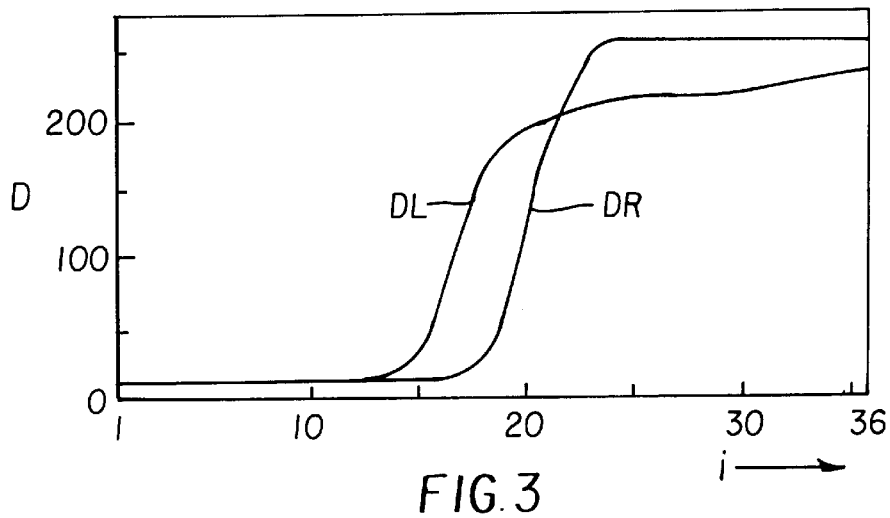
FIG. 3 is a pattern diagram showing both the left and right sensor data groups which have been corrected according to the first method.

FIG. 1(a) shows the manner in which left and right optical sensor arrays receive a pair of images of an object according to the first through third methods of the invention, and FIG. 1(b) shows the manner in which to form combinations of subgroups of right and left sensor data groups representative of the pair of images, while FIG. 1(c) shows errors in phase differences detected according to each of the above methods. FIG. 2 shows sensor data groups before they are corrected, and FIG. 3 shows sensor data groups which have been corrected according to the first method. FIG. 4 shows subgroups before and after corrected according to the second method, and FIG. 5 shows sensor data groups which have been compensated according to the third method.

More specifically, FIG. 1(a) shows an optical instrument of external light triangulation method type, wherein an image of an object 1 is focused on left and right optical sensor arrays or elements 3L, 3R, through left and right small lenses 2L and 2R, respectively. The left and right small lenses 2L and 2R are attached to the optical instrument such that the base lines of the lenses 2L, 2R are spaced apart from each other by a predetermined small distance or length "b", and such that the lenses 2L, 2R face the object 1 located a distance "d" in front of the lenses 2L, 2R. Left and right optical sensor arrays 3L, 3R are positioned a relatively small focal length "f" away from the lenses 2L, 2R, and the left and right small lenses 2L, 2R focus a pair of images of the object 1 on the corresponding optical sensor arrays 3L, 3R, through respective optical paths LL, LR.

If the object 1 is located at an infinite-point, the center of each of the pair of the images is focused on the reference position of the corresponding optical sensor array 3L, 3R which is aligned with the optical axis of each of the lenses 2L, 2R. If the object 1 comes closer to the optical instrument, away from the infinite-point, the images are focused on positions which are deviated "$\sigma_L$" and "$\sigma_R$" from the reference positions of the optical sensor arrays 3L, 3R. If the sum of these deviations is defined by $\sigma = \sigma_L + \sigma_R$, according to the principle of simple triangulation distance measuring method, the distance "d" to the object 1 is defined as d=bf/σ. This is called external light triangulation method as discussed above. Since the distance "b" between the base lines of the lenses 2L, 2R and the focal length "b" in the above equation are constants of the optical instrument, the distance "d" can be obtained by detecting the deviation "σ". In focusing the optical instrument on the object, however, it is easier and more convenient to use the deviation "σ" itself, instead of calculating the distance "d" on the basis of the deviation "σ". This deviation "σ" is a phase difference between a pair of images, which is to be detected according to the method of the present invention.

When the deviation of the optical instrument from the focused condition with respect to the object 1 is detected by means of internal light, the light passing through an image pickup lens is received by the lenses 2L, 2R, so that a phase difference σ between left and right images is detected in a similar manner. In this case, the centers of the images coincide with the reference positions of the respective optical sensor arrays 3L, 3R when the optical instrument is focused on the object 1. The positive and negative signs of the phase difference σ indicates whether the focal point of the optical instrument is in front of or behind the object 1, and its absolute value indicates a degree of the deviation from the focused condition where the optical instrument is focused on the object 1.

In the example as shown in FIG. 1(a), the object 1 is patterned such that its left half is dark and its right half is bright. Therefore, the left and right optical sensor arrays 3L and 3R which receive the image produce a left sensor data group DL and a right sensor data group DR, as shown in the upper part of FIG. 1(b), in which data D on the left-hand side of each of the sensor data groups DL, DR have relatively low values, while data D on the right-hand side of the sensor data group DL, DR have relatively high values. If the background of the object 1 has bright backlight as described above, and stray light "SL" enters the right optical sensor array 3R, as illustrated in FIG. 1(a), the data of the right sensor data group DR as a whole have higher levels than those of the left sensor data group DL, and thus represent a different image pattern from that represented by the data of the left sensor data group DL. In the example of FIG. 1, each optical sensor array 3L, 3R, which is schematically represented by an elongated rectangular block in FIG. 1(a), consists of 36 optical sensors, and each of the sensor data groups DL, DR includes sensor data D having data number "i" ranging from 1 to 36, which correspond to the optical sensors.

To detect the phase difference between the pair of left and right images of the object 1, subgroups dL and dR each consisting of 18 sensor data are selected or picked up from the left and right sensor data groups DL, and DR, as shown in FIG. 1(b), so as to make (m+1) combinations as indicated by C0 through Cm in the figure. With respect to each combination, an index representing a degree of correlation between the left and right subgroups dL, dR is calculated. In FIG. 1(b), the number variable "j" is used and a j-th combination is indicated by "Cj".

In the example as shown in FIG. 1(b), the first combination C0 is prepared by selecting a right end portion of the sensor data group DL as the left subgroup dL, and a left end portion of the sensor data group DR as the right subgroup dR. The next combination C1 and the following combinations are prepared by alternately shifting selected portions of the sensor data groups DL, DR to the left and the right, by one data at a time. Where the combination Cj is prepared in this manner, m (Cm is the last combination) is equal to 2(N-n), where "N" represents the number of data in each sensor data group DL, DR, and "n" represents the number of data in each subgroup dL, dR. In this example where N=36, n=18 and m=36, the total number of the combinations is m+1=37. While the index representing the degree of correlation of each combination Cj may be calculated by various methods, it is preferred to obtain an index from the sum of absolute values of differences between corresponding data of the left and right subgroups dL and dR. In this case, the minimum value of the index indicates the maximum correlation.

The left and right sensor data groups DL, DR of FIG. 1(b) are concurrently shown in the same graph of FIG. 2, to clearly show a difference between image patterns represented by these data groups DL, DR. It is natural that these two patterns deviate from each other in the direction of the data number "i", depending upon the distance "d" of the object 1. It should be noted, however, that the data values of the right sensor data group DR are higher than those of the left sensor data group DL, due to intrusion of the stray light SL. In particular, the values D of eight-bit data in the right end portion of the right sensor data group DR are saturated at 255, and thus represents a different pattern from that represented by the corresponding portion of the left sensor data group DL. This causes errors in detected values of the phase differences σ as described above.

According to the first method of the present invention, the combination Cj of the subgroups as described above is prepared after a difference in the average of data values between the left and right sensor data groups DL, DR is eliminated so as to compensate for a difference in the levels of these sensor data groups DL and DR as described above. FIG. 3 shows the left and right sensor data groups DL, DR after this compensation. In this example, the level of the data values D of the left sensor data group DL is elevated from that in FIG. 2. Although the difference in the levels of the sensor data groups DL, DR is not fully compensated in the right side portion of FIG. 3, it is almost completely compensated in the left side portion of FIG. 3.

Figure 4A:
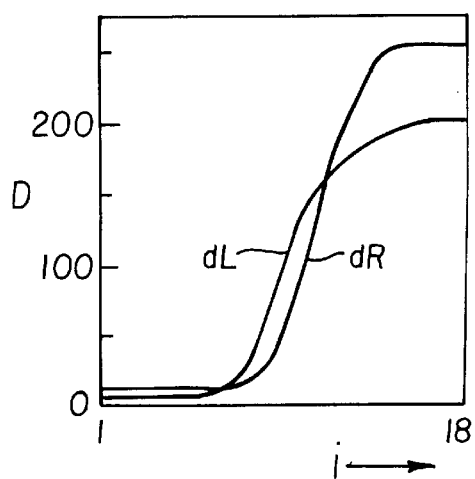
FIG. 4(a) is a pattern diagram showing a particular combination of left and right subgroups before they are corrected.

According to the second method of the present invention, a difference between representative values of the left and right subgroups dL, dR of each combination is eliminated, so as to compensate a difference in the level and patterns between the left and right sensor data groups DL, DR as shown in FIG. 2. FIG. 4(a) shows the left and right subgroups dL, dR of the 19th combination (j=19) before the correction as described above, while FIG. 4(b) shows the left and right subgroups dL, dR of the same combination after the correction. Referring to FIG. 2, the portions of the left and right sensor data groups DL, DR from which these subgroups dL, dR are selected are shown by windows "WL" and "WR", respectively.

Figure 4B:
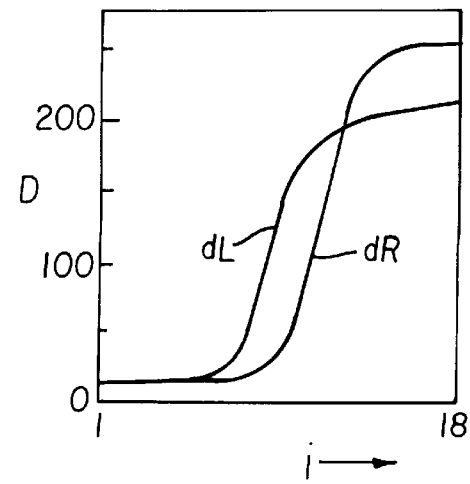
FIG. 4(b) is a pattern diaphragm showing the combination of the subgroups of FIG. 4(a) which have been corrected according to the second method of the invention.

The representative values of the subgroups dL, dR used for the correction according to the above second method may be preferably data values having a specific data number, such as the top or first data value (i=1), or the average of the data values of each subgroup. The data number "i" in FIGS. 4(a) and 4(b) is the internal number of the subgroups dL, dR each consisting of eighteen data. As is understood from FIGS. 4(a) and 4(b), FIG. 4(b) shows the result of the correction in which a difference between the top data values as representative values of the subgroups dL, dR of FIG. 4(a) is eliminated. The representative values are not limited to the top values, but may be central values of the left and right subgroups. In the case of the combination Cj where j=19 as shown in FIGS. 4(a) and 4(b), the result of the correction is substantially the same as that as shown in FIG. 4(b) even if the average of the data values of the left and right subgroups is used as the representative value.

According to the third method, the combination of the subgroups is prepared after each data value is replaced by a differential approximate value with respect to the data number variable "i", so as to compensate differences in the level and pattern between the left and right sensor data groups DL, DR of FIG. 2. As the differential approximate value used for this correction, it is practical to use a so-called two-point approximate value as a difference between each data and the adjacent data, as known in the art, or a three-point approximate value as a difference between each data and two adjacent data thereof, or, in the case of an end data, a double of a difference between two adjacent data including the end data.

Figure 5A:
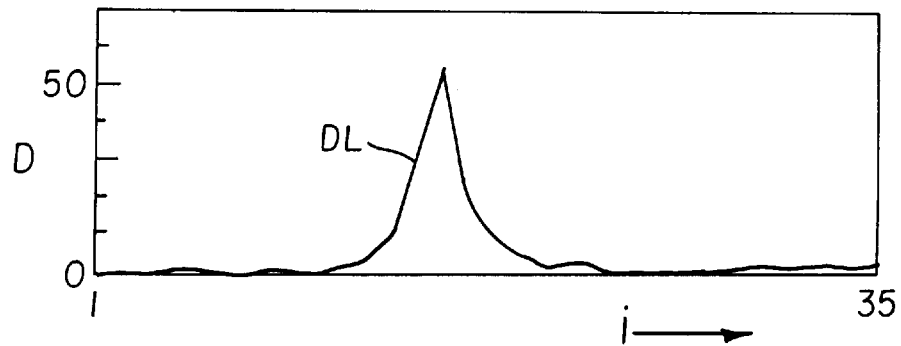
FIG. 5(a) is a pattern diagram showing a left sensor data group corrected according to the third method.
Figure 5B:
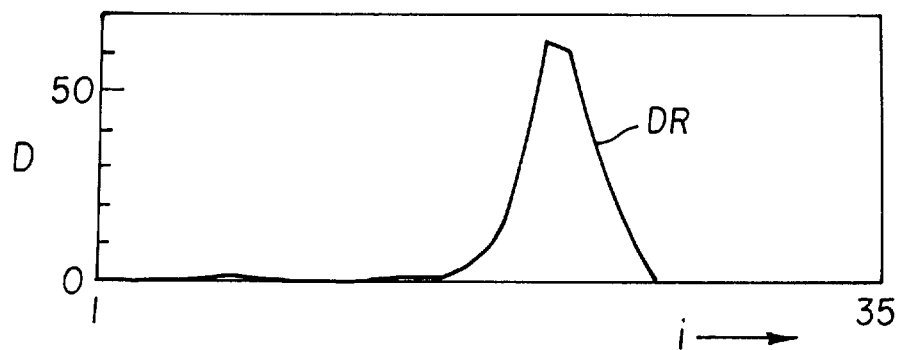
FIG. 5(b) is a pattern diagram showing a right sensor data group corrected according to the third method.

FIG. 5(a) and FIG. 5(b) shows the left and right sensor data groups DL and DR, respectively, which have been corrected by using two-point approximate values as the differential values. As is understood from these figures, a difference in the levels of the sensor data groups DL, DR shown in FIG. 2 is almost completely compensated. The sensor data groups DL, DR also have substantially the same patterns after the correction. This may be because the influence of the stray light on the pattern of the right sensor data group DR does not change as much as a characteristic (degree) of increase or decrease with respect to (associated with) the variable "i", and is therefore substantially compensated by differentiation.

In any of the first through third methods as described above, the index indicative of the correlation between the left and right subgroups dL, dR is calculated with respect to each combination of the subgroups, and the combination having the maximum correlation is selected. The phase difference σ is then obtained from the portions of the sensor data groups DL, DR from which the subgroups of the selected combination are picked up. If the reference positions of the left and right optical sensor arrays 3L, 3R of FIG. 1(a) corresponding to the lenses 2L, 2R are numbered "Nr" as counted from the right and left end of the arrays 3L, 3R, respectively, and the number of the optical sensors in each array is "N", while the number of data in each subgroups is "n", the phase difference σ is represented by the equation: σ=jo+n−2Nr, where the number of the combination having the maximum correlation is "jo".

FIG. 1(c) indicates measurement results of errors ▲σ in the phase difference σ calculated in the manner as described above. The characteristic curves A, B (B1 and B2), and C in this figure were obtained in the cases where the first, second and third methods were employed, respectively, and the characteristic curves B1, B2 were obtained in the cases where the top or first data value and the average of all data values were respectively used as the representative value for correcting the subgroups dL, dR. In the tests, the left and right contrast (in brightness) of the object 1 was varied in five steps, i.e., 0.7, 1.2, 2.4, 3.7, and 4.0 EV, and the object 1 was illuminated from the front side with a floodlight, so that the image of the object 1 was received by a module in which the lenses 2L, 2R were integrated with the optical sensor arrays 3L, 3R. In the meantime, an incandescent lamp of dozens of watts which serves as a light source of the stray light SL was disposed on the right-hand side behind the object 1, so that the stray light SL impinges mainly on the right lens 2R. The distance "d" between the object 1 and the module was set to 1.5 m, and, in this case, the accurate of the phase difference σ was 7.60. The phase difference was detected in each test with the accuracy of two decimal places, utilizing the interpolation as described above.

Figure 6:
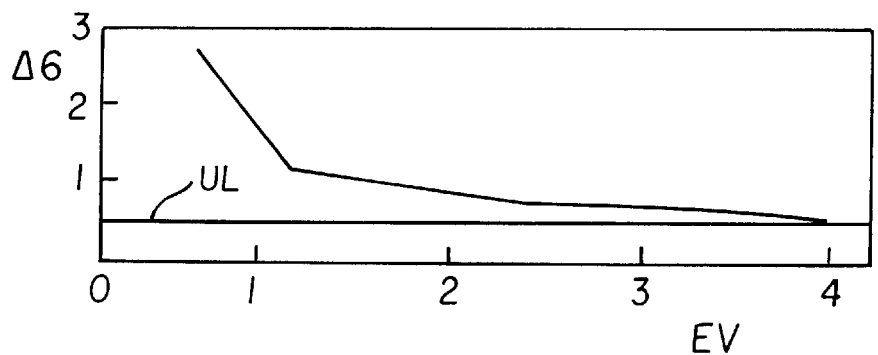
FIG. 6 is a graph showing errors in the phase difference detected according to the conventional method.

Referring to FIG. 1(c), the detecting errors ▲σ of the phase differences σ obtained according to the first method were in the positive range of 0.11 to 0.18, as indicated by the characteristic curve A, and those obtained according to the second method were in the positive or negative range of 0.00 to 0.08 when the contrast was larger than 1 EV, as indicated by the characteristic curves B1, B2 of the second method, though they were above this range with the contrast smaller than 1 EV. The errors ▲σ of the phase differences σ obtained according to the third method were in the positive range of 0.00 to 0.09, as indicated by the characteristic curve C. As compared with the results of FIG. 6 wherein the errors ▲σ cannot be reduced down to the permissible upper limit UL, i.e., 0.50, or lower, according to the conventional method, the present invention allows the errors ▲σ to be lower than this permissible upper limit, and even lower than 0.20, a more desirable limit of the errors with a few exceptions. It will be understood from the above that according to the first to third methods of the invention, the errors ▲σ of the phase differences can be reduced several tenths to one tenth of those occurring in the conventional method.

As explained above, according to the first method, the sensor data groups received from the optical sensor arrays and representing respective image patterns of the object are corrected so as to eliminate a difference in the average value of the sensor data between the sensor arrays, and a plurality of combinations each having two subgroups corresponding to the optical sensor arrays are prepared, such that each subgroup consists of a predetermined number of a series of sensor data selected from the sensor data group which has been corrected, and such that a portion in the sensor data group from which the subgroup is selected is sequentially shifted. By selecting one of the combinations having a maximum degree of correlation between the subgroups, and detecting a phase difference from positions on the optical sensor arrays which correspond to the subgroups of the selected combination, a difference in the brightness between the left and right images of the object due to intrusion of stray light can be compensated, and detecting errors in the phase difference can be reduced to several tenths to one tenth, as compared with the conventional method.

According to the second method of the invention, the subgroups of each of the combinations are corrected so as to eliminate a difference in the representative value of the sensor data between the subgroups. The representative value may be the value of data having a predetermined data number, or the average value of the sensor data, for example. By detecting a phase difference from the combination having the maximum correlation between the subgroups that have been corrected, a difference in the brightness between the left and right images and a change in the image pattern due to intrusion of stray light can be compensated, whereby detecting errors in the phase difference can be reduced, with a few exceptions, down to several tenths to one tenth as compared with the conventional method.

According to the third method of the present invention, each of the sensor data of the left and right sensor data groups is corrected by replacing each sensor data with a differential approximate value associated with a variable in the form of the data number of the sensor data. By preparing a plurality of combinations of subgroups selected from the sensor data groups thus corrected, and detecting a phase difference from the combination having the maximum correlation between the pair of subgroups, a difference in the brightness between the left and right images and a change in the image pattern due to intrusion of stray light can be almost completely compensated, whereby detecting errors in the phase difference can be reduced to about one tenth as compared with the conventional method.

The above-described effects can be easily achieved by effecting any of the first, second and third methods without putting an increased burden on either hardware or software systems used in the conventional method. The methods of the present invention having the above advantages are particularly suitably applied to an auto-focusing camera in the form of a lens-shutter camera employing external light triangulation method, or to an auto-focusing camera employing a TTL method in which a degree of deviation from its focused condition where the camera is focused on an object is detected with use of an internal light passing through an image pick-up lens. Thus, the present methods find wider applications, and assures increased accuracy with which the optical instrument is can be focused on an object.

What is claimed is:

1. A method of detecting a phase difference between a pair of images of an object, which images are formed on a pair of optical sensor arrays through different optical paths comprising the steps of:

preparing a sensor data group representing a pattern of each of said pair of images and consisting of sensor data received from each of said pair of optical sensor arrays, correcting said sensor data group so as to eliminate a difference in an average value of the sensor data between the optical sensor arrays caused by a presence of flare in one of said pair of images;

preparing a plurality of combinations each having two subgroups corresponding to said pair of optical sensor arrays, each of said two subgroups consisting of a predetermined number of a series of sensor data, which are selected from the sensor data group which has been corrected such that a portion of the sensor data group from which the subgroup is selected is sequentially shifted; and selecting one of the combinations having a maximum degree of correlation between the subgroups thereof, and detecting a phase difference from positions on said optical sensor arrays which correspond to the subgroups of the selected combination.

2. A method of detecting a phase difference between a pair of images of an object, which images are formed on a pair of optical sensor arrays through different optical paths, comprising the steps of:

preparing a sensor data group representing a pattern of each of said pair of images and consisting of sensor data received from each of said pair of optical sensor arrays, preparing a plurality of combinations each having two subgroups corresponding to said pair of optical sensor arrays, each of said two subgroups consisting of a predetermined number of a series of sensor data selected from said sensor data group, such that a portion in the sensor data group from which the subgroup is selected is sequentially shifted;

correcting said subgroups of each of the combinations so as to eliminate a difference in a representative value of the sensor data between the subgroups caused by a presence of flare in one of said pair of image; and selecting one of the combinations having a maximum degree of correlation between the subgroups thereof, and detecting a phase difference from positions on said optical sensor arrays which correspond to the subgroups of the selected combination.

3. A method as defined in claim 2, wherein said representative value of each of said subgroups is a value of one of said sensor data having a predetermined data number.

4. A method as defined in claim 2, wherein said representative value of each of said subgroups is an average value of the sensor data of said each subgroup.

5. A method of detecting a phase difference between a pair of images of an object, which images are formed on a pair of optical sensor arrays through different optical paths, comprising the steps of:

preparing a sensor data group representing a pattern of each of said pair of images and consisting of sensor data received from each of said pair of optical sensor arrays;

correcting said sensor data group by replacing each of said sensor data with a differential approximate value associated with a variable in the form of a data number of said each sensor data to correct for the presence of flare in one of said pair of images;

preparing a plurality of combinations each having two subgroups corresponding to said pair of optical sensor arrays, each of said two subgroups consisting of a predetermined number of a series of sensor data selected from the sensor data group compensated, such that a portion in the sensor data group from which the subgroup is selected is sequentially shifted; and selecting one of the combinations having a maximum degree of correlation between the subgroups thereof, and detecting a phase difference from positions on said optical sensor arrays which correspond to the subgroups of the selected combination.

6. A method as defined in claim 5, wherein said differential approximate value for correcting said sensor data group is a difference between a first one of the sensor data, and a second one of the sensor data which is adjacent to said first one in a predetermined direction.

* * * * *